United States Patent
Blurfrushan et al.

[11] Patent Number: 5,754,746
[45] Date of Patent: May 19, 1998

[54] MULTI BIT PER PIXEL COMPRESSION/ DECOMPRESSION USING PARALLEL ENCODED STREAMS

[75] Inventors: Farzin Blurfrushan, Redondo Beach; Ronald E. Joiner, Pasadena; Sang C. Kang, Irvine, all of Calif.

[73] Assignee: Xerox Corporation, Stamford, Conn.

[21] Appl. No.: 573,987

[22] Filed: Dec. 18, 1995

[51] Int. Cl.$^6$ .................................................. G06F 15/00
[52] U.S. Cl. .................................. 395/114; 395/117
[58] Field of Search ................... 395/101, 109, 395/111, 112, 114, 117, 133, 135, 126, 128, 129, 131; 382/175, 176, 178, 244, 246, 247, 248, 232, 242, 245; 358/538, 539, 540, 261.1, 261.2, 461

[56] References Cited

U.S. PATENT DOCUMENTS 4,888,812  12/1989  Dinan et al. ........................... 382/140
5,225,911   7/1993  Buckley et al. ........................ 358/296
5,530,555   6/1996  Taaka et al. ........................... 358/298

*Primary Examiner*—Joseph Mancuso
*Assistant Examiner*—Gabriel I. Garcia
*Attorney, Agent, or Firm*—Robert Cunha

[57] ABSTRACT

A system for printing background and foreground colors in response to mask data and printing instructions. Page description language data is separated onto three lines, two for Contone and solid colors, and one for control (mask data and instructions). The mask and instruction data is transformed into a series of multi-bit command words, each describing a pixel in terms of 1) control tag bits to specify color, 2) object optimized rendering tag bits to describe the type of color (solid, text, sampled or line art), 3) color space transformation bits to control conversion from other spaces to CYMK and 4) format tags to specify the number of bits per pixel. This series of command words combines information on one line that required at least two lines in the prior art, and the data is in easily compressable form, resulting in simplified hardware.

4 Claims, 3 Drawing Sheets

MULTI BIT PER PIXEL COMPRESSION/DECOMPRESSION USING PARALLEL ENCODED STREAMS

BACKGROUND OF THE INVENTION

An improved circuit for converting page description language into a form more easily stored and transmitted before combining and printing the resultant sampled pictures, halftones, text and solid color data, and, more specifically, a circuit for combining the mask and instruction data into one channel prior to storage to reduce the complexity of the hardware required.

U.S. Pat. No. 5,225,911 describes a system for combining data such as sampled color and constant color to produce a printed page that has, for example, text of one color printed over a sampled color picture, and is incorporated herein by reference. In the course of printing complex pages, it is frequently necessary to store a representation of the page for future use, or to transmit the page representation to a remote site for printing, and of course, it is imperative that the data be compressed before transmission or storage.

To increase the compressibility of the data, the above referenced patent describes a system wherein the various kinds of data are separated, depending on the type of object, (text, constant color run, sampled contone data, etc), and then each component is compressed using an algorithm optimized for the specific type of data. Thus, for example, a bit map of text would use a binary runlength encoder (ex: CCITT) while sample data would be more efficiently compressed using a contone compression method (ex: JPEG).

This prior art system is based on four main channels, 1) a sample color channel for contone data, 2) a constant color channel for tone information of text and graphic objects, 3) a mask channel used to switch between two colors and 4) a control or command channel consisting of a descriptor field which specifies how the other channels are controlled and a runlength field which shows for how many pixels the current mode is valid. Typically, the mask channel is utilized to switch between background/foreground color sources. In this prior art system there are two types of command words. Normal command words (16 bits) having a 10 bit descriptor with fields for selecting source, mask and sample channels and the other 6 bits are used as runlength for up to 64 pixels. The other type is repeat command words. If the run of pixels is longer than 64, then the repeat word will follow the normal command using a 13 bit field for the remainder of the run. It is also used to encode other information such as end of line, end of page and runs of white pixels.

The question is whether some other arrangement of instruction, runlength and mask data would result in similar compression performance but simplified hardware.

SUMMARY OF THE INVENTION

In a printing system, the page description language data which describes all aspects of the final printed page is sent out on one line to the printer. If it is necessary to keep a record of the printed pages, the page description language can be stored on, for example, magnetic media. However, this is not efficient since page description language may not compress well and can not be decomposed/printed realtime. In the prior art, the various kinds of information (instructions, masks, etc) are separated out into individual channels and then compressed. This is an improvement since each channel can have a compression algorithm optimized for its data. One channel will be solid color. This data typically exists as a number of bits per pixel, is an instance of a constant color run and therefore need not be compressed further. Another channel will be for contone. Here there are a number of bits per pixel, and the data, in most cases, changes little from one pixel to the next (although there are occasional image edges). This contone data can put on a separate channel, and may be compressed using an algorithm optimized for contone, such as JPEG. The mask channel contains the shape information for text or any object where the color changes between two values. The mask compresses best with some kind of binary run length compression. Finally, there will be a channel for instructions which controls the other channels and contains the runlength values of how the other channels are utilized.

This invention takes the process one step further. Instead of having separate instruction and mask channels, this system processes and combines these two into one control channel data stream which not only contains both kinds of data but also is in a form that can be compressed efficiently. In addition, other object information such as color space, object tags, etc can be incorporated and encoded in this control stream. The result is that the hardware is considerably simplified since the number of channels containing compression hardware has been reduced to three, contone, solid color and control, with the control data in a form that can be compressed efficiently by using a lossless scheme such as LZW or runlength compression. On the other two channels, the sampled images such as pictures are compressed using a lossy scheme such as JPEG with the result visually lossless, and other color information such as fills, sweeps and text color can be compressed (optional) using a lossless scheme similar to the one used in the control channel. By preprocessing the data, the number of channels, and therefore the complexity of the hardware, can be reduced.

As stated above, some color information, such as solid color, is received in a compact form and need not be compressed in either the prior art, or in this described embodiment. The point of departure from the prior art is in the control channel. In the prior art the mask and instruction data are simply separated and individually compressed, requiring two channels each having its own compressor. In this embodiment, the mask and instruction data are merged and transformed into a particular format that is contained on one line, and which is in a form that is readily compressed, thereby requiring one compressor. Thus, the hardware is considerably simplified.

DETAILED DESCRIPTION OF THE DRAWINGS

Figure 1:
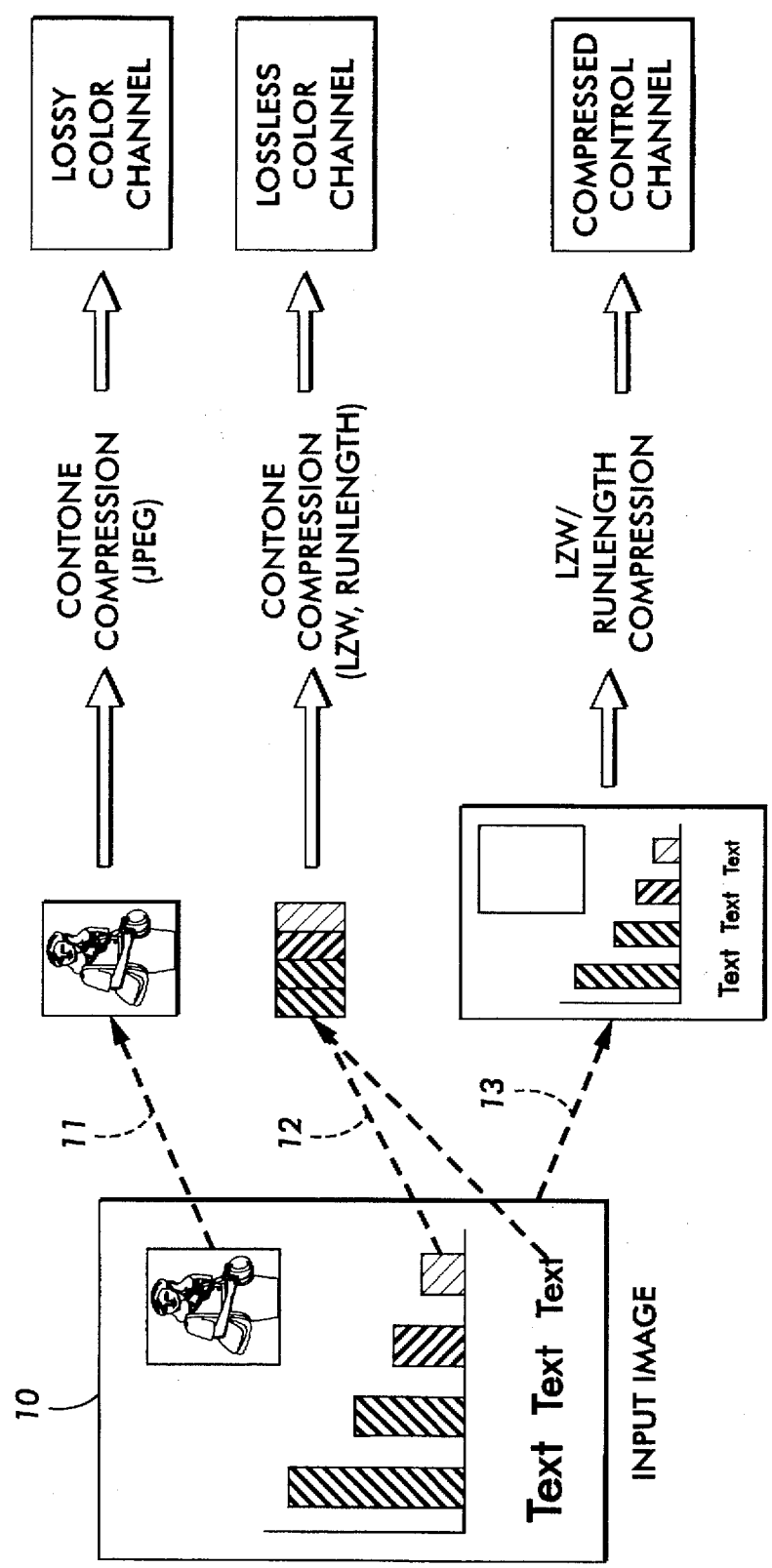
FIG. 1 is a simple diagram showing the data separated into the three channels.

FIG. 1 is a simple block diagram of this invention. Here, the original page description language describing a page 10 is separated into two color channels 11, 12. As shown, one channel 11 may be for contone and the other 12 for solid colors. Each channel has a number of compression algorithms to choose from, depending on the data involved. The remaining information in the input page description language is supplied to the control channel 13 where it is formatted and compressed using codes such as LZW, runlength compression or the like.

Figure 2:
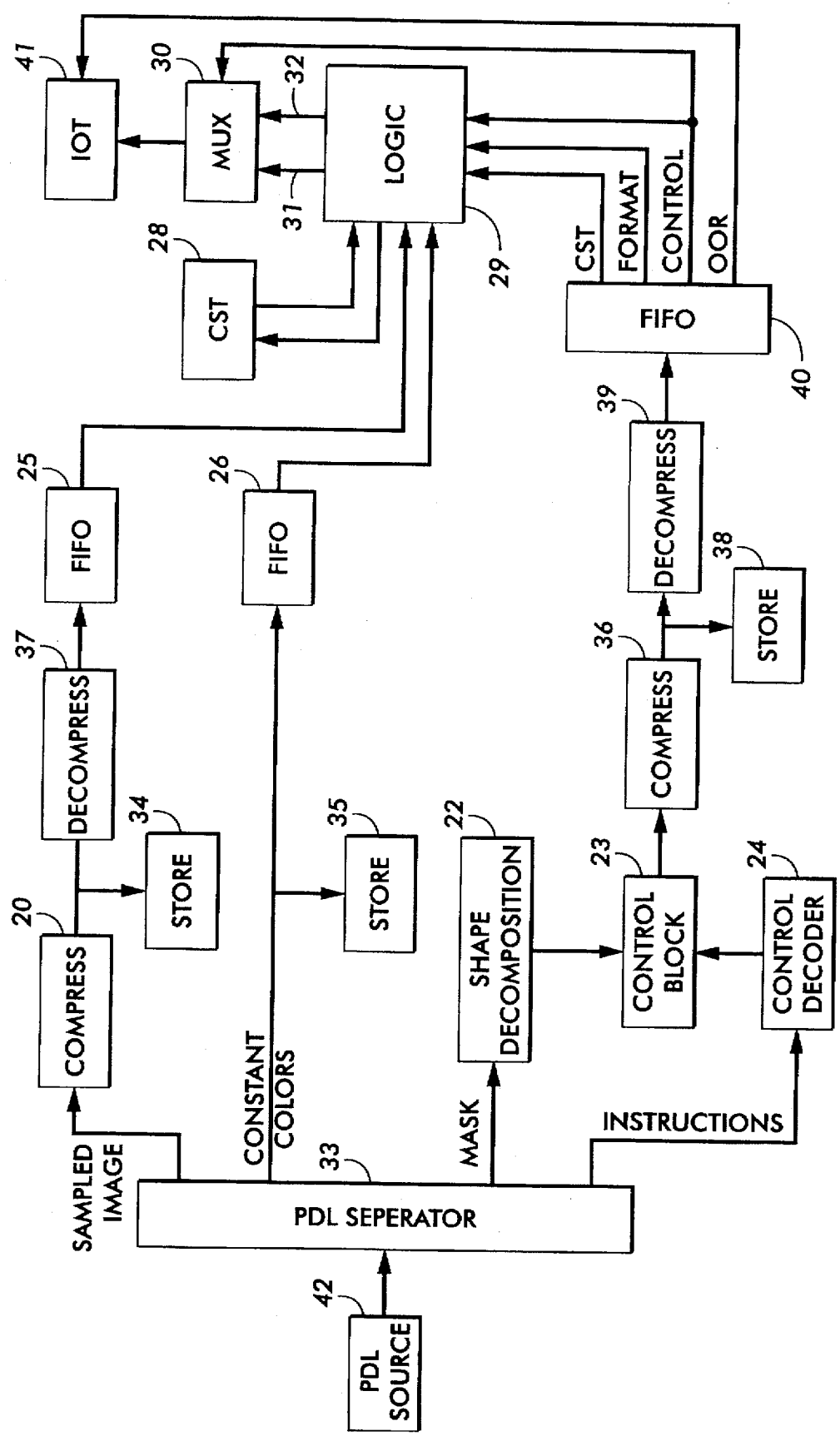
FIG. 2 is a block diagram of the entire printing system.

FIG. 2 is a more detailed block diagram of the elements of the circuit. The sampled color or contone data from a PDL source 42 is separated out by the PDL separator 33, is compressed 20 and stored 34 before being decompressed and applied to the logic 29, which will be further explained below, through FIFO 25.

Constant colors already are in a form, usually a number of bits per pixel that remain constant over an area, that may not requires any compression, and therefore, there is no compression shown for this channel prior to storage 35. Instead, the data is stored 35 and applied directly to the FIFO 26 and logic 29. In the alternative, constant color can be compressed lossless elsewhere, not shown in this figure.

The shape or mask, typically in the form of run lengths, are created 22 and the instructions in 24. Then both as well as other information such as color space transformation (CST), format, and object optimized rendering tags are combined in the control block 23, which is compressed 36, stored 38 and decompressed 39 before being applied to FIFO 40.

Logic 29 is a combiner logic which uses the control information to load or store color information from the two input color sources (from fifos 25 and 26) into two registers which hold background and foreground colors. These registers will source the inputs of multiplexer 30, the final output stage, which uses the control bits to toggle between outputting the foreground or background color to produce the output which is sent to the image output terminal (IOT) 41.

The CST tag bits are used to instruct the logic 29 to send the color data in the logic to the CST 28 if the color, as received from either FIFO 25 26 is not in the CMYK color space for printing and must be converted. The format tag controls the logic 29 to accept and transmit 8, 16, 24 or 32 bit words. Finally, the OOR tag bits are sent downstream to control the halftone generator or other system elements to handle each different kind of data differently, as needed. For example, the halftone generator may use different screen patterns depending on the data type. Also, high addressability may be used to increase the apparent quality of font edges.

In the sampled image channel and control channel, all data is shown being transmitted through the compressors and decompressors before being applied to the associated FIFO. However, an alternative is for the the sampled image data or control block 23 output to bypass the associated compressors and decompressors, and be applied directly the the associated FIFO.

Figure 3:
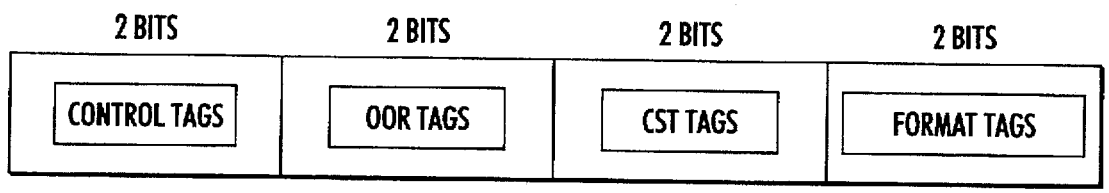
FIG. 3 is a table of a typical set of tag bits.

FIG. 3 is an example of how the data of the control channel is arranged. In this example there are four fields of 2 bits each, but there could be more fields, or more bits per field. The first bit is a control bit for the multiplexer 30. The options are:

1—Load a new constant color or load sampled pixel into background or foreground color register inside the combiner (logic 29). The register chosen depends on the state of the previous run of the output data. If the background register was sourcing the last run of output pixel then load the new color into foreground and source it immediately (i.e. current run will be from newly loaded foreground register).

2—Source background color or source foreground color (which are already loaded into the two color registers). This is useful in case of alternating colors (as in the old mask) where we load the two colors and let the control toggle between the two.

The OOR tags specify whether the current data is a solid color, text, line art or sampled pictures, so that each may be handled differently at the halftoner in the printer. The CST tag bits tell the logic 29 whether the data is in CMYK, or to convert the current data into CYMK from RGB, LAB or YUV. Finally, the format tag bits instruct the logic on whether the current data is packaged in 8, 16, 24 or 32 bits per pixel.

Figure 4:
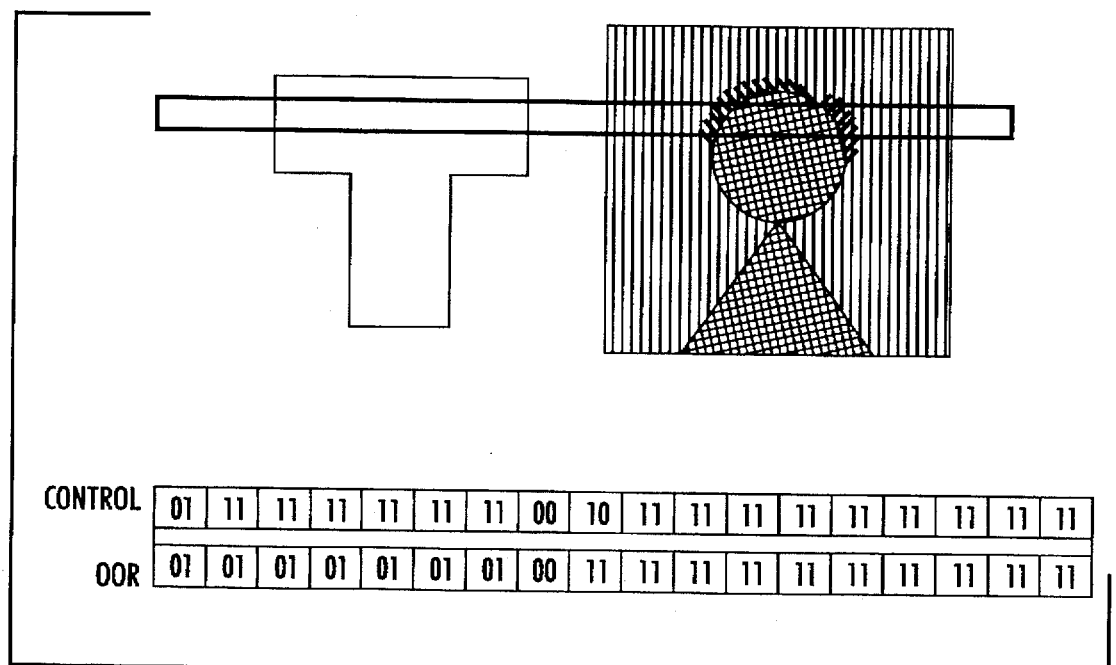
FIG. 4 shows the use of the control and object optimized rendering (OOR) tag bits.

The interaction of the tag bits will determine the printed output. For example, FIG. 4 shows the control and OOR bits to print text and a sampled picture over a solid background. To print a horizontal scan through the top of the letter, in the first cycle, the control bits order the loading of a color (01) and the OOR bits specify that it is text (01). Then, for the duration of the font, the control bits are 11, foreground, and the OOR bits are 01, text.

Between the text and picture there is one clock cycle of background. This is specified by control bits of 00, background, and OOR bits of 00, tint/fill with solid color.

Finally, for one raster of the sampled picture, on the first cycle there will be control bits of 10, use sample, and the remaining control bits for the duration of the picture will be 11, foreground (This implies that if the source is a sample the foreground register will be loaded continuously by combiner. Alternatively control code of 10 could be used for the duration of the run which explicitly do this). Also, for the duration of the picture raster, the OOR bits will be 11, sample.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A printing system for printing background pixels in one color and foreground pixels in another color comprising:

a source of data describing contone sampled colors, solid colors, and controls (instructions plus mask describing where the two color types are to be painted on a page), means for separating out said contone color onto a first line; for separating out said solid color onto a second line; and for combining said instructions and mask data onto a third line and into a series of first multi-bit control words, one first multi-bit word per pixel, each first multi-bit control word describing whether a contone sampled color or a solid color is printed, second means for compressing said series of first multi-bit control words to form compressed words, means for transmitting or storing said compressed words, first means for decompressing said compressed words to form second multi-bit control words, means responsive to said second multi-bit control words and coupled to said first and second lines for outputting one of said contone or solid colors, and means for printing the output of said means for outputting.

2. The system of claim 1 further comprising third means for compressing and fourth means for decompressing said contone or solid colors in series with said first or second line, respectively.

3. A printing system for printing background pixels in one color and foreground pixels in another color comprising:

a source of page description language containing data describing contone sampled colors, solid colors, and controls (instructions plus mask describing where the two color types are to be painted on a page), means for separating out said contone color onto a first line; for separating out said solid color onto a second line; and for combining said instruction and mask data onto a third line and into a series of first multi-bit control words, one first multi-bit word per pixel, each first multi-bit control word describing whether a contone sample color or a solid color is printed, second means for compressing said series of first multi-bit control words to form compressed words, means for transmitting or storing said compressed words, first means for decompressing said compressed words to form second multi-bit control words, means responsive to said first multi-bit control words and coupled to said first and second lines for outputting one of said contone or solid colors, and means for printing the output of said means for outputting.

4. The system of claim 3 further comprising third means for compressing and fourth means for decompressing said contone or solid colors in series with said first or second line, respectively.

* * * * *